US008125981B2

(12) United States Patent
Barzegar et al.

(10) Patent No.: US 8,125,981 B2
(45) Date of Patent: *Feb. 28, 2012

(54) SYSTEM AND METHOD OF PROVIDING A HIGH-QUALITY VOICE NETWORK ARCHITECTURE

(75) Inventors: Farhad Barzegar, Branchburg, NJ (US); Irwin Gerszberg, Kendall Park, NJ (US); Thomas H. Hill, Jr., Succasunna, NJ (US); Scott Joseph Mollica, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 666 days.

This patent is subject to a terminal disclaimer.

(21) Appl. No.: 12/266,847

(22) Filed: Nov. 7, 2008

(65) Prior Publication Data
US 2009/0059905 A1    Mar. 5, 2009

Related U.S. Application Data

(63) Continuation of application No. 10/978,886, filed on Nov. 1, 2004, now Pat. No. 7,450,570.

(60) Provisional application No. 60/516,928, filed on Nov. 3, 2003.

(51) Int. Cl.
*H04L 12/64* (2006.01)
(52) U.S. Cl. .................................................. 370/352
(58) Field of Classification Search .................. 370/352
See application file for complete search history.

(56) References Cited

U.S. PATENT DOCUMENTS

| 6,567,399 | B1 | 5/2003 | Schuster et al. |
| 6,675,054 | B1 | 1/2004 | Ruberg |
| 6,782,412 | B2 | 8/2004 | Brophy et al. |
| 7,023,839 | B1 * | 4/2006 | Shaffer et al. ............. 370/356 |
| 7,167,460 | B2 | 1/2007 | Zehavi et al. |
| 7,388,853 | B2 | 6/2008 | Ptasinski et al. |
| 7,599,356 | B1 * | 10/2009 | Barzegar et al. ............. 370/352 |
| 7,974,271 | B2 * | 7/2011 | Barzegar et al. ............. 370/352 |
| 2006/0287746 | A1 | 12/2006 | Braithwaite et al. |

OTHER PUBLICATIONS

Richard Grigonis, The Secret World of Interworking, VON Magazine, Nov./Dec. 2003.
K.P.T. Raatikainen, Interworking Support in a Multi-Discipline Switch, VTT Information Technology, Telecommunications, Finland.
Allen Sulkin, PBX Systems for IP Telephony, pp. 169-171, McGraw-Hill, 2002. ISBN 0-07-137568-6.

* cited by examiner

*Primary Examiner* — Melvin Marcelo

(57) ABSTRACT

Embodiments of the invention include a system and method for providing high quality voice/sound communications over a local loop of a telephone network. The method aspect of the invention comprises receiving a voice signal, digitizing the voice signal into a high quality voice signal, utilizing sampling rates greater than 8000 samples per second and/or sample sizes greater than 8 bits per sample, negotiating voice processing characteristics between a customer premises equipment and a network element such as a softswitch, receiving speech from a user at a customer premises equipment according to the negotiation, converting the received speech into high bandwidth signal and transmitting the high bandwidth signal to a telephone local loop, transmitting the high bandwidth signal from the local loop to wideband node that packetizes the high bandwidth signal for transmission to a packet network and receiving the packetized signal from the packet network at a switch that switches between an on-network or off-network status. A voice over IP platform may also be used to route packetized signals from the packet network to either the telephone network or another packet network.

20 Claims, 3 Drawing Sheets

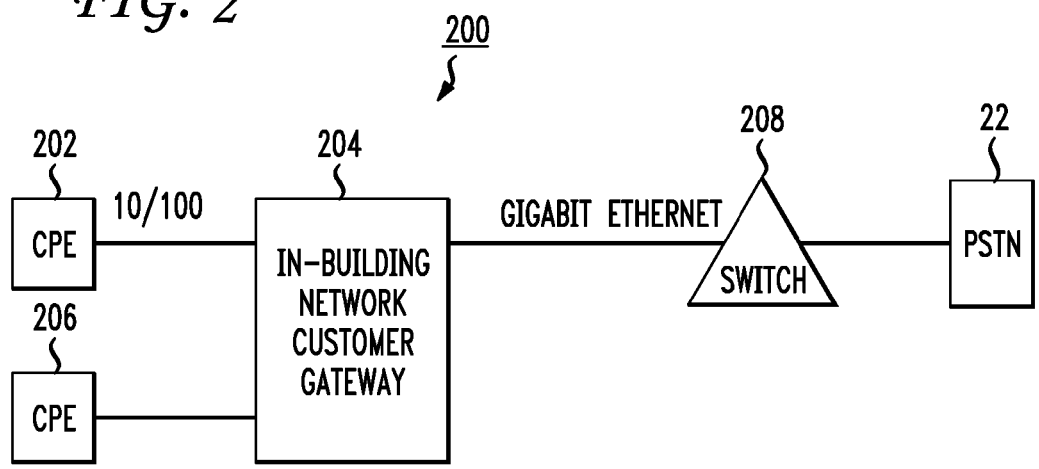
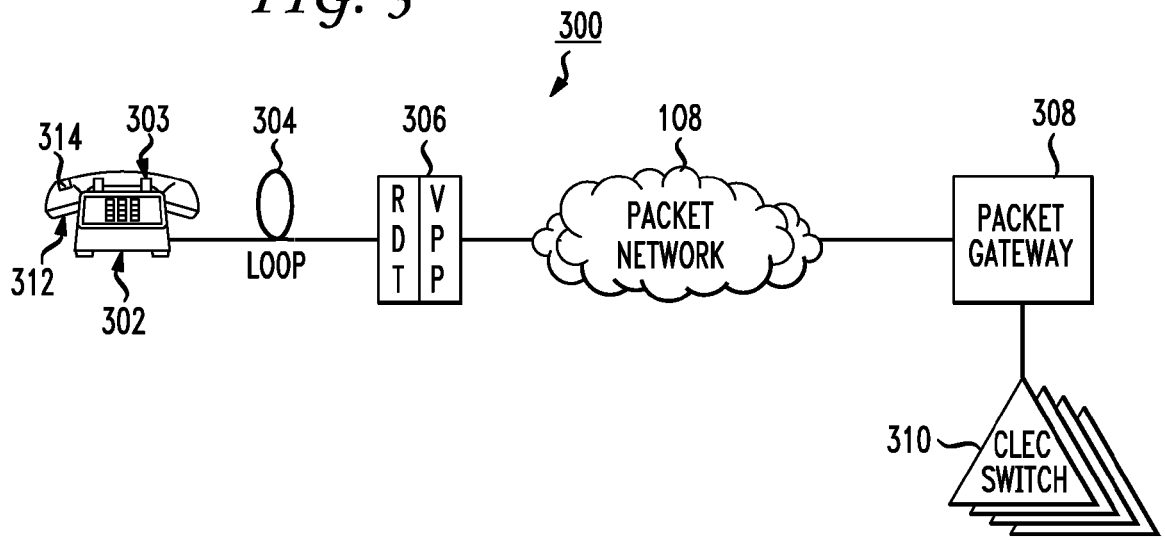

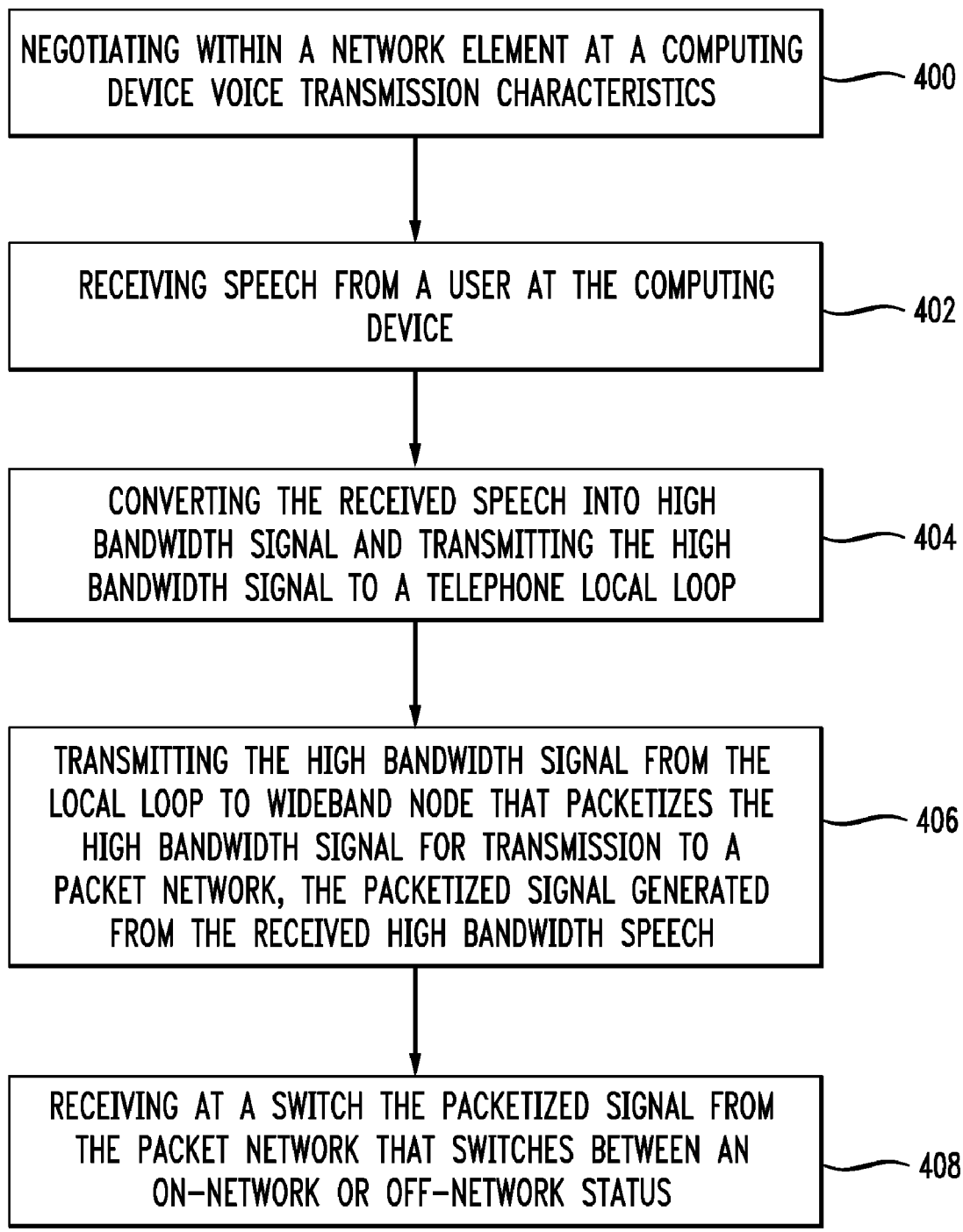

SYSTEM AND METHOD OF PROVIDING A HIGH-QUALITY VOICE NETWORK ARCHITECTURE

PRIORITY CLAIM/RELATED APPLICATIONS

The present application is a continuation of U.S. patent application Ser. No. 10/978,886, filed Nov. 1, 2004, which claims domestic priority to U.S. Provisional Patent Application No. 60/516,928 filed Nov. 3, 2003, the contents of which are incorporated herein by reference. The present invention is also related to U.S. patent application Ser. No. 10/980,053, filed Nov. 3, 2004, and U.S. patent application Ser. No. 10/980,056, filed Nov. 3, 2004, the contents of which are incorporated herein by reference in their entirety.

BACKGROUND OF THE INVENTION

1. Field of the Invention

The present invention relates to telecommunications systems and methods and more specifically to a high-quality voice network architecture.

2. Introduction

There is a longstanding problem of poor quality in speech delivered over telephone networks and specifically the public switched telephone network (PSTN). The PSTN is the concatenation of the world's public circuit-switched telephone networks. Originally a network of fixed-line analog telephone systems, the PSTN now has many digital and wireless components. The PSTN is largely governed by technical standards and uses telephone numbers for addressing. The basic telephone system still uses basic power communication principles wherein a central office that applies power to the telephone lines. Many users have noticed that in a power outage, they still have a telephone signal for this reason. These lines are typically copper or a hybrid of fiber and coaxial cable. They inherently are low bandwidth transmission lines. There has been a desire over time to increase the bandwidth of these standard transmission lines such as data by data compression.

The basic digital circuit in the PSTN is a 64-kilobit-per-second channel, originally designed by Bell Labs called a "DS0" or Digital Signal 0. To carry a typical phone call from a calling party to a called party, the audio sound is digitized at an 8 kHz sample rate using 8-bit pulse code modulation. The DS0's are the basic granularity at which switching takes place in a telephone exchange. DS0's are also known as timeslots because they are multiplexed together in a time-division fashion. Multiple DS0's are multiplexed together on higher capacity circuits, such that 24 DS0's make a DS1 signal, which when carried on copper is the well-known, T-carrier system, T1 (the European equivalent is an E1, containing 32 64 kbit/s channels). In modern networks, this multiplexing is moved as close to the end user as possible, usually into cabinets at the roadside in residential areas, or into large business premises.

The timeslots are conveyed from the initial multiplexer to the exchange over a set of equipment collectively known as the access network. The access network and inter-exchange transport of the PSTN use synchronous optical transmission (SONET and SDH) technology, although some parts still use the older Plesiochronous Digital Hierarchy (PDH) technology.

In addition to the mu-law and A-law coding techniques commonly used in the PSTN to improve the dynamic range in the voice passband, various compression techniques (e.g., ADPCM, CELP) for data transmission rates under 64 kbps are also widely deployed. These efforts are attempts to improve the network efficiency with minimal degradation to the quality of sound transmitted over cellular radio access network and packet-based (e.g., IP and ATM) networks. However, there has yet be established a definitive technology for improving the transmission of sound over telephone-band networks.

The reduction in sound quality over the telephone has many downsides. For example, in normal conversation, sounds or portions of words spoken may be dropped or lost via the low bandwidth. These kinds of disturbances hinder the enjoyment of any conversation. In many languages, small sound nuances provide different meanings and any degree of reduced sound quality reduces the capability of hearing and understanding the speaker.

In addition to human-human interaction, the instances of human-computer speech interaction are also increasing. For example, people may call a help line for a business and engage in a human-computer dialog using technology available from AT&T Corp. These speech services include a speech server that includes modules for automatic speech recognition (ASR), language understanding, dialog analysis, and text-to-speech for carrying on a conversation with the user using natural language. These components are known to those of skill in the art. These systems, however, require clean speech from the user to provide accurate and acceptable ASR. With standard telephone speech, however, the low-bandwidth speech, with dropped portions of words transmitted and low quality sound "hear" by the ASR module of a speech recognition system, reduce the capability of the system to engage the user in a normal conversation.

What is needed in the art is an efficient and effective technology for improving the quality of voice and other sounds transmitted over the PSTN or similar network. These improvements will provide more enjoyable personal discussions as well as improve the use of spoken dialog systems over PSTN networks.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention disclosed herein relates to a high-quality voice network architecture. Embodiments of the invention include a system and method for providing high bandwidth communications to a local loop of a telephone network. The method aspect of the invention comprises digitizing an audio signal utilizing sampling rates greater than 8000 samples per second and/or sample sizes greater than 8 bits per sample, negotiating voice transmission characteristics between a computing device into which a user speaks and a network element, receiving speech from the user at the computing device, converting the received speech into high bandwidth signal and transmitting the high bandwidth signal to a telephone local loop, transmitting the high bandwidth signal from the local loop to wideband node that packetizes the high bandwidth signal for transmission to a packet network and receiving the packetized signal from the packet network at a switch that switches between an on-network or off-network status. A voice over IP platform may also be used to route packetized signals from the packet network to either the telephone network or another packet network.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a CPE gateway with multiple interfaces;

FIG. 3 illustrates electronic loop provisional according to an aspect of the present invention; and FIG. 4 illustrates a method aspect of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention provides a high-quality voice network architecture that improves the speech and sound quality in telephone speech. The invention relates to methods, systems and computer-readable media for providing a high-quality voice network. The increased bandwidth can exist over existing copper loops and hybrid fiber and coaxial lines. The improved bandwidth enables greater voice services over standard telephone lines. Where the dynamic range of the signal is expanded according to this invention, voice recognition and TTS techniques are more powerful. Users can hear and understand the other party better than using the tradition low-bandwidth approach.

The development in entertainment technologies (e.g., CD, DVD, MPEG/MP3) include 16 or 24-bit sampling at 44.1/48 kHz and higher. These technologies are becoming more advanced and utilized in the use of music, multimedia and other contexts for the transmission of sound signals. This can improve the frequency response and dynamic range of the transported audio channel. A sampling rate with a higher number of bits per sample can be used to increase the potential dynamic range and expand the frequency response and improve the signal-to-noise ratio. See co-pending and commonly assigned utility patent application Ser. No. 09/694, 210, filed on Oct. 23, 2000, the contents of which are incorporated herein by reference.

The high-quality voice network architecture (HQVNA) disclosed herein solves the long-felt industry need to transport a broader audio spectrum using the existing telephone system, eliminating the problem of dropped sound in which individual letters and/or digits are lost in spoken names or numbers during voice transmission. Dropped sound occurs because the full voice spectrum cannot be transmitted over wires using analog technology. This concept provides an innovative approach to delivering voice services in the public switched telephone network (PSTN) by increasing the bandwidth (and therefore the service quality) of voice communications.

Figure 1A:
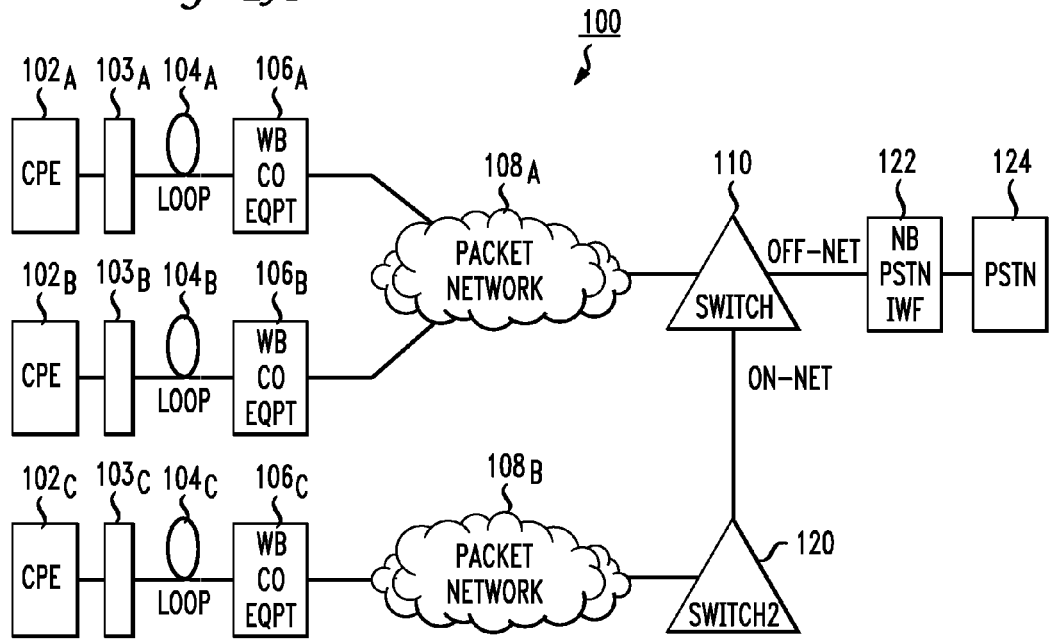
FIG. 1A illustrates an example embodiment of the high quality voice network architecture.

FIG. 1A illustrates the basic system architecture 100 for the HQVNA. This architecture has the ability to provide higher bandwidth between Customer Premises Equipment (CPE) endpoints 102A, 102B, 102C, equal to or greater than 64 Kbps. The CPE may be a computing device of any type of terminal equipment such as a telephone, key system, PBX, modem, video conferencing device, and so forth. This may also refer to connected telecommunications equipment (CTE). The computing device has improved voice codecs that compress voice utterances to CD-like quality in the communications network and represents a fundamental change in the audio quality of signals previously intended for the telephone local loop and PSTN. The improvement using this system is comparable to switching from AM radio quality sound to FM quality sound. This is preferably performed by using improved voice compression codec and compression algorithms at the CPE. For example, the higher quality voice coder may encode a single audio channel at 16 bits per sample with a 48 kHz sampling rate as is used with DVD-quality sound and compressed and transmitted using a 768 kbps transmission rate, which is switched can be switched via conventional circuit or packet technologies (e.g., ISDN, ATM, Ethernet, or IP). The architecture also provides for negotiation between the CPE and a softswitch or other network element so as to enable the architecture to take advantage of the full capabilities of the CPE as well as providing an optimal reception, compression and transmission of voice signals received from a user. The optimal processing of the voice signals based on the negotiation with the network element can be based on the CPE capabilities, a called-party computing device capability (CPE, regular telephone, computer, cellphone, etc.), network capabilities or bottlenecks and so forth.

The HQVNA 100 includes the following elements: a CPE 102A, 102B or 102C for enhanced acoustics connected via a respective local loop 104A, 104B or 104C or other connection to another computing device such as a broadband digital network connection (ISDN, cable, DSL, or the like) 103A, 103B, 103C for communicating with the high-quality voice network or with the local loop 104A, 104B, 104C. The CPE has means for converting the received speech utterance from a user into a wideband signal that is transmitted to the local loop. The local loop transmits the signal to the broadband digital network connection or wideband central office network equipment 106A, 106B, 106C which connects a user to the packet network 108A, 108B. The equipment 106A, 106B, 106C may packetize the signals for transmission to the packet network as well as performing many other functions.

In telecommunications, the local loop is the wiring between the central office and the customer's premises demarcation point. As mentioned above, the telephony local loop connection is typically a copper twisted pair carrying current from the central office to the customer premises and back again. Individual local loop telephone lines are connected to the local central office or to a remote concentrator. Local loop connections can be used to carry a range of technologies, including analog voice ISDN and DSL. The term "local loop" is also sometimes used loosely for any "last mile" connection to the customer, regardless of technology. As technology improves, there is a transition from the lower bandwidth copper twisted pair to higher bandwidth means. This transition will take time but there is a need for wideband communications over the copper twisted pair or other local loop media immediately.

The wideband connection equipment 106A, 106B, 106C transmits data from the respective CPE to a packet network 108A or 108B. The packet network may represent the Internet, an Ethernet network, a wireless network or some other packet network and the like. Although the communication link between the CPE and the equipment 106A, 106B, 106C is shown as the local loop, other means may also be used to communicate between these devices, for example a wideband wireless link or an alternate cable connection or other wideband connection.

Alternate embodiments do not specifically require a packet network but can provide some other type of non-packet network. For example, a system according to this aspect of the invention comprises the use of a circuit such as an ISDN transport as an alternate to a packet transport and switching. This type of system may utilize time domain switching for HQVNA.

Soft switching via softswitch 110 and switch2 120 communicate with the packet network 108A, 108B and the PSTN 124. Soft switching provides programmed switching to go on-net and off-net during the periods of time when the new technology must work with existing technology is also incorporated.

An "on-net" call originating and terminating within the high-quality voice network would flow through the architecture as follows. There is a search for the equivalent to an "off-hook" condition at the CPE 102A, 102B, 102C. Then a process is commenced to seize appropriate resources. Negotiation can proceed between the CPE 102A, 102B, 102C and the switch 110, 120 in terms of what allowable resources are available. For example, the CPE 102A can inform the switch 110 as to the capabilities of the CPE 102A and then CPE 102C can inform switch 120 of its capabilities for a negotiation using CPE 102A, CPE 102C, switch 110 and switch 120 to arrive at an optimal arrangement for transmission of voice signals. The issues for negotiation include, such as, without limitation, what kind of quality the end device can accept, what kind of speaker(s) are available at the CPE, whether the CPE is capable of receiving or transmitting stereo or quadraphonic or 5.1 or 6.1 sound, whether other high-quality or lower-quality parameters have been satisfied, etc. There can be mechanisms provided at the switch and at the CPE for determining the capabilities of the originating element.

A subscription mechanism can also be provided prior to negotiation to initially identify the capabilities of the CPE. The CPE can be associated with authorized users and pre-identified capabilities.

Negotiation between the CPE and the switch can include authentication mechanisms. A determination can also be made as to the type of connection that is being requested and to what destination using conventional means, such as signaling of dialed digits to the switch. The switch can then proceed to negotiate bandwidth to the terminating element. Once the terminating element acknowledges connectivity, the call is established and the signal proceeds through the network.

An "off-net" call originating (or terminating) within the high-quality voice network and terminating (or originating) within the legacy low-quality voice network would similarly flow through the architecture. Where the advanced CPE is talking to legacy CPE, it is advantageous to "downshift" the signal so that the call becomes like any regular call on the legacy network. Alternatively, the above-mentioned switch can be responsible for conversion of the legacy voice signal into a higher-class signal for processing at the advanced CPE.

Where a high quality voice connection has been established, the high bandwidth call can advantageously be mapped to an existing data connection protocol (such as ISDN) so as to effectively use existing hardware capabilities.

The softswitch 110, 120 typically provides for call routing and call state functions and can enable and control connectivity with the packet network 108A, 108B and between the packet network and the legacy PSTN 124. The softswitch includes the capability of negotiating between the CPE and the software regarding the capabilities of the CPE.

Translation between HQVNA encoding and PSTN encoding techniques are performed by a narrow band (NB) PSTN interworking function (IWF) 122, as needed to interwork with the portion of the PSTN limited to DS0-based switching and transport. Associated databases such as the Directory Services and Operator Services are not shown.

The interworking function enables new and different networks to interact with the PSTN. Voice traffic can be coded in different ways in different networks. For example, the GSM standard applies to a mobile network with digital access. Voice coding in GSM gives 13 kbit/s (or half that figure), which must be converted into 64 kbit/s to allow switching in the PSTN. The GSM network performs this code conversion. In ISDN, voice traffic is usually coded in the same way as in the PSTN.

Figure 1B:
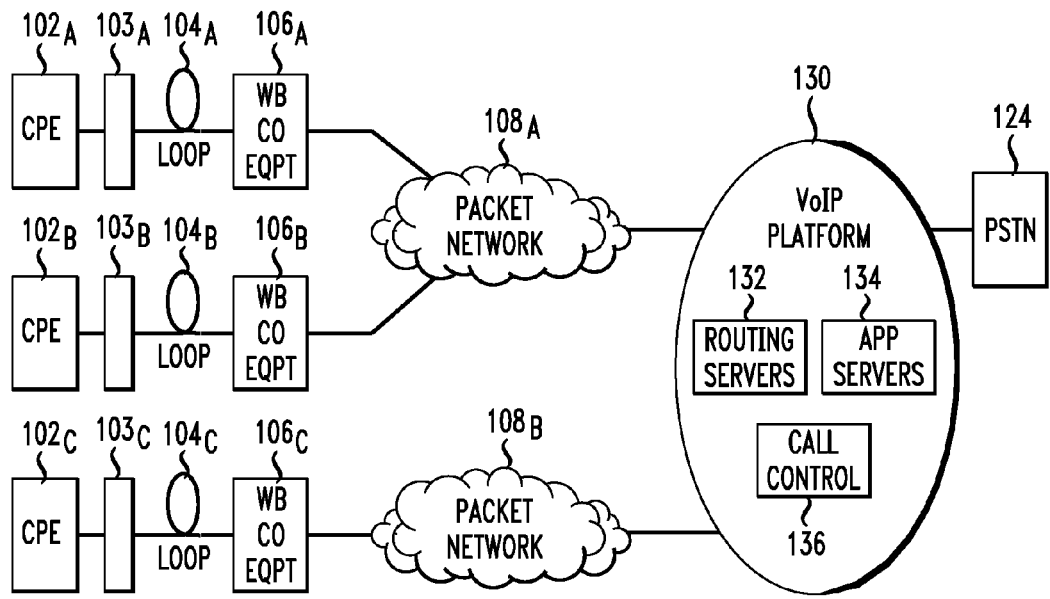
FIG. 1B illustrates another embodiment of the high quality voice network architecture in the Voice over IP context.

While the present invention mainly has applicability to voice communication, its principles will also apply to data communication. In data traffic, different types of interconnection can be used. The PSTN subscriber uses a modem or the like that provides a certain capacity on a line that is either dialed-up or leased. Then, dedicated Pulse-code modulation (PCM) links interconnect the PSTN and the data network. If the data network is packet-switched, as is shown in FIGS. 1A and 1B, an adapting function in the form of a packet assembly/disassembly may be installed at the connection point of the network. Hence, as for fax traffic, the PSTN does not perform any adjustment for data traffic.

FIG. 1B shows architecture related to a Voice over IP context. Here, the CPE, local loop and wideband connection means connect the CPEs to packet networks 108A, 108B. The packet networks communicate with the PSTN via a Voice over IP (VoIP) Platform 130 which includes known features such as routing servers 132, application server 134 and call control modules 136. Each of these VoIP modules communicates with each other to manage and transmit voice communication signals received and transmitted via the platform 130. The VoIP platform 130 communicates with the PSTN 124. In this manner, a user can use the benefits of the high quality voice connection via the VoIP platform to the PSTN 124.

Examples of the CPEs further include a HQVNA-capable media terminal adapter (MTA) and a cable modem in a cable access network. Any device may be used for different access technologies employed to provide the packet network.

FIG. 2 illustrates an alternate embodiment of a system 200 associated with a CPE gateway with multiple CPEs 202, 206. This is a layer 2 solution aspect of the invention. The various CPEs 202, 206 communicate with an in-building network 204. The network 204 may be a local area network (LAN) or any other kind of network utilized to connect multiple CPEs 202, 206. The network 204 communicates with a switch 208 via a connection such as a Gigabit Ethernet connection. The switch 208 communicates with the PSTN 22.

FIG. 3 provides another aspect of the invention. Electronic loop provisioning 300 is illustrated in this figure. A telephone or CPE 302 is connected via a local loop or other communication means 304 with a remote digital terminal (RDT) and voice packet processor (VPP) 306. The output from that component 206 is transmitted to a packet network 108 and to a packet gateway 308. The packet gateway is connected to a plurality of the competitive local exchange carrier (CLEC) switches 310.

There are benefits to HQVNA include increased revenue, strategic implementation and the ability to block competitors. Customer retention will also increase through the use of voice telephony over a telecommunications network because of the superior HQVNA voice quality. Cell phone users may also use the HQVNA attractive for calls where higher bandwidth facilities are available (e.g., via a local wireless fidelity or WiFi network). This would eliminate the problem of poor connections, fading speech and dropped connections common to wireless calls. A voice over IP platform may also be used to route packetized signals from the packet network to either the telephone network or another packet network.

FIG. 4 illustrates a method aspect of the invention. The method comprises negotiating with a network element at a computing device (such as a customer premises equipment) voice transmission characteristics (400) and receiving speech from a user at the computing device (402). Part of the step of receiving the speech from the user comprises digitizing the received speech into a high quality voice signal utilizing sampling rates greater than 8000 samples per second and/or sample sizes greater than 8 bits per sample. Throughout this disclosure, any reference to speech or voice can also be interpreted as any sound. The network element may be a softswitch, another CPE, or any other network node. An example includes a network node that includes the capability of monitoring the path of a signal from the calling party to the called party and identifying bottlenecks in bandwidth and determining a threshold capability for transmission and negotiating with the CPE to instruct the CPE to receive, code, and transmit the received voice to match the capabilities of the network for that particular call.

The computing device includes a microphone and means for compressing speech into a high bandwidth signal for transmission to the local loop. The computing device also includes the means to negotiate with a network element, such as a softswitch or another computing device or network node, the voice encoding speed, the compression rate and the transmission rate of the audio signal. In this manner, the speech at which the voice data is received, encoded, compressed and transmitted may conform to the capabilities of the network, called party computing device, any bottlenecks in the network, and so forth. The method further comprises converting the received speech into high bandwidth signal and transmitting the high bandwidth signal to a telephone local loop (404) and the like. The next step is transmitting the high bandwidth signal from the local loop to a wideband central office node that packetizes the high bandwidth signal for transmission to a packet network, the packetized signal generated from the received high bandwidth speech (406). Next, a softswitch receives the packetized signal from the packet network that switches between an on-network or off-network status (408).

The CPE 202, 206, shown in FIG. 2, can be implemented in a number of different embodiments. The CPE can be implemented as a customer gateway which performs voice digitization and packetization and converts analog signals into telephony packets. This is depicted abstractly in FIG. 2. A customer gateway 204 has a broadband connection, e.g. using a high-speed packet interface, to a softswitch 208. The customer gateway 204 performs the above-mentioned negotiation with the softswitch 208 and is capable of requesting variable bandwidth, depending on the device supported.

In accordance with an advantageous embodiment, the customer gateway has a number of different interfaces on it. The customer gateway can have a regular plain old telephone service (POTS) line interface. When a conventional telephone, assume CPE 206 is a regular telephone, is attached to the POTS line interface on the customer gateway 204, the customer gateway requests only the 64 kbps bandwidth or less, depending on the codec utilized. The customer gateway 204 also has a high quality voice interface line that, preferably, supports some "plug-and-play" capabilities. A customer would plug in a high quality telephone 202, e.g., one that supports stereo audio, and the customer gateway 204 would detect the capabilities of the device and utilize these parameters in its negotiations with the softswitch 208. The customer gateway should be capable of negotiating with the switch and asking for a higher quality bandwidth.

The customer premises equipment advantageously is not limited to the conventional configuration familiar to all telephony users. In accordance with an embodiment of an aspect of the present invention, the telephony handset 303 shown in FIG. 3 includes a plurality of speaker elements placed in different locations on the handset. The location of the speaker elements is chosen so as to be advantageous for purposes of the customer's auditory experience. For example, and without limitation, in one embodiment, one speaker can be positioned in the traditional "listening" portion of the handset 312 while a second speaker 314 can be positioned on the opposing side of the handset. Alternatively, the speakers can be positioned next to one another but provided with directionality that hits the inside of the customer's ear from different pressure points.

The size and nature of each speaker element does not need to be uniform. For example, and without limitation, one of the speaker elements can act as the equivalent of a bass booster or as a sub-woofer. Different speaker elements, provided with enough bandwidth, can be utilized to reproduce the equivalent of 5.1 or 6.1 sound. It should be noted that the speaker elements provided in the handset should be of sufficient quality to enable the transmission of the high-quality voice signal, unlike the conventional construction of the speakers in a conventional handset.

As discussed above, the particular acoustical capabilities of the customer premises equipment can be negotiated between the customer premises equipment and the network switch.

Another aspect of the invention relates to the use of an intelligent phone. The customer gateway functionality and the telephone set functionality can be combined into a single device, as depicted by 202 in FIG. 2. Unlike IP phones, however, the present embodiment includes a more complicated digitizer and packetizer that supports more higher quality voice and more complicated forms of audio. As mentioned above, the digitizer will digitize a received voice or audio signal into a high quality voice signal utilizing a sampling rate that is at least 8000 samples per second and/or sample sizes greater than 8 bits per sample. Whereas the prior art phone would connect and reserve no more than 64 kbps, the present embodiment can support the reservation of higher bandwidth for increased quality and/or more audio channels, e.g. for stereo sound. The device should have a packet interface to connect directly to the broadband connection and should also include a mechanism for negotiating with the softswitch 208, as discussed above.

It is preferable that the packets exchanged between the customer gateway 204 or the intelligent phone 202 and the softswitch 208 be encrypted. The switch can retain a code that permits law enforcement to tap a connection, pursuant to CALEA restriction.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the system may include a voice over IP component, an asynchronous transfer mode (ATM) component or be used on an Ethernet network. All or a portion of the high bandwidth signal may also be transmitted via a wireless medium via a number of known protocols. As another example, while the specification details the invention in terms of receiving a voice signal at a computing device, the voice signal being digitized and processed, it the present invention is not limited to voice signals. Any sound may be received at a computing device and processed according to the principles of the invention. Therefore, any location where voice or a digitized voice signal is referenced, it may be assumed that any sound may be processed in the same manner within the scope of the invention. Accordingly, the appended claims and their legal equivalents should only define the invention, rather than any specific examples given.

We claim:

1. A system for providing high quality sound communications, the system comprising:
   means for negotiating between a computing device and a network element characteristics associated with sound reception and transmission;
   means for receiving a first sound signal at the computing device and transmitting a second sound signal from the computing device to a telephone local loop, the second sound signal comprising a high quality sound signal associated with the first sound signal;
   means for digitizing the first sound signal into the high quality sound signal, utilizing sampling rates greater than 8000 samples per second and/or sample sizes greater than 8 bits per sample;
   means for receiving the high quality sound signal from the telephone local loop and transmitting a packetized signal to a packet network, the packetized signal generated from the received high quality sound signal; and
   means for receiving the packetized signal from the packet network and switching between an on-network and off-network status.

2. The system of claim 1, wherein when the means for switching switches to an off-net status, the packetized signal is transmitted to a telephone network.

3. The system of claim 2, wherein the telephone network is the publicly switched telephone network.

4. The system of claim 1, wherein the means for transmitting the packetized signal to the packet network further comprises a voice over IP network.

5. The system of claim 1, wherein the means for transmitting the packetized signal to the packet network further comprises an asynchronous transfer mode network.

6. The system of claim 1, wherein the means for transmitting the packetized signal to the packet network further comprises means for transmitting the packetized signal over an Ethernet network.

7. The system of claim 1, wherein when the means for switching switches to an on-network status, a call is transmitted from a first computing device to a second computing device without using a telephone network.

8. The system of claim 7, wherein when the means for switching switches the system to an off-network status, a call is transmitted from the first computing device to the second computing device through a telephone network.

9. The system of claim 1, wherein the network element is a softswitch.

10. The system of claim 1, wherein the negotiated characteristics associated with sound reception and transmission comprise at least one of: sound compression, sound coding, signal sampling rate, and a signal transmission rate.

11. The system of claim 1, wherein the negotiated characteristics associated with sound reception and transmission comprise technical capabilities of a calling party computing device.

12. The system of claim 11, wherein the negotiated characteristics associated with sound reception and transmission further comprise the technical capabilities of a called party computing device.

13. The system of claim 1, wherein the negotiated characteristics associated with sound reception and transmission relate to network capabilities.

14. The system of claim 13, wherein the negotiated characteristics associated with sound reception and transmission further relate to network bottlenecks.

15. The system of claim 1, wherein the means for switching of the high quality sound signal utilizes time domain switching.

16. The system of claim 15, wherein the time domain switching uses an ISDN transport.

17. A method for providing high bandwidth communications, the method comprising, in a communications network:
negotiating sound processing characteristics between a computing device and a network element;
receiving a first sound signal at the computing device according to the negotiation;
receiving a digitized version of the first sound signal, wherein the first sound signal is digitized into a second sound signal comprising a high quality sound signal, utilizing sampling rates greater than 8000 samples per second and/or sample sizes greater than 8 bits per sample;
transmitting the high quality sound signal to a wideband node that packetizes the high quality sound signal to yield a packetized signal for transmission to a packet network; and
receiving the packetized signal from the packet network at a switch that switches between an on-network or off-network status.

18. The method of claim 17, wherein when the switch is on-network, the switch routes the packetized signal from the packet network to a second packet network.

19. The method of claim 17, wherein when the switch is off-network, the switch routes the packetized signal from the packet network to a telephone network.

20. The method of claim 19, wherein the telephone network is a publicly switched telephone network.

\* \* \* \* \*